United States Patent [19]

Okubo

[11] Patent Number: 5,185,703
[45] Date of Patent: Feb. 9, 1993

[54] ANTI-LOCK CONTROL METHOD FOR AUTOMOTIVE VEHICLES

[75] Inventor: Satomi Okubo, Saitama, Japan

[73] Assignees: Akebono Brake Industry Co., Ltd., Tokyo; Akebono Research and Development Centre Ltd., Hanyu, both of Japan

[21] Appl. No.: 633,800

[22] Filed: Dec. 26, 1990

[30] Foreign Application Priority Data

Dec. 27, 1989 [JP] Japan .................. 1-336492

[51] Int. Cl.⁵ ............................................. B60T 8/58
[52] U.S. Cl. ............................... 364/426.02; 303/96; 303/102
[58] Field of Search ............ 364/426.02, 426.03; 180/197; 303/95, 96, 100, 102, 103, 105, 106

[56] References Cited

U.S. PATENT DOCUMENTS

| | | | |
|---|---|---|---|
| 4,762,375 | 8/1988 | Maki et al. | 303/103 |
| 4,773,014 | 9/1988 | Hagiya et al. | 303/95 |
| 4,774,668 | 9/1988 | Matsubara et al. | 364/426.02 |
| 4,797,825 | 1/1989 | Shimanuki et al. | 364/426.02 |
| 4,917,444 | 4/1990 | Ishido et al. | 303/100 |
| 4,924,394 | 5/1990 | Uchida et al. | 303/95 |
| 4,982,806 | 1/1991 | Yoshizawa et al. | 364/426.02 |
| 4,991,910 | 2/1991 | Shimanuki et al. | 303/105 |

Primary Examiner—Gary Chin
Attorney, Agent, or Firm—Cushman, Darby & Cushman

[57] ABSTRACT

An anti-lock control method and apparatus is characterized in that if the highest one VwH of the speeds of the four wheels of the vehicle is still lower than a prescribed threshold speed and not increasing at a second time point at which a prescribed time $\Delta T$ has elapsed after a first time point at which the highest wheel speed becomes lower than the threshold speed, the estimated vehicle speed is modified to be equal to the highest wheel speed VwH, thereby preventing an automotive vehicle from being not braked at the start of anti-lock control immediately after an estimated vehicle speed has changed away from the actual vehicle speed as the wheel of the vehicle performs an acceleration slip before the start of the anti-lock control.

4 Claims, 5 Drawing Sheets

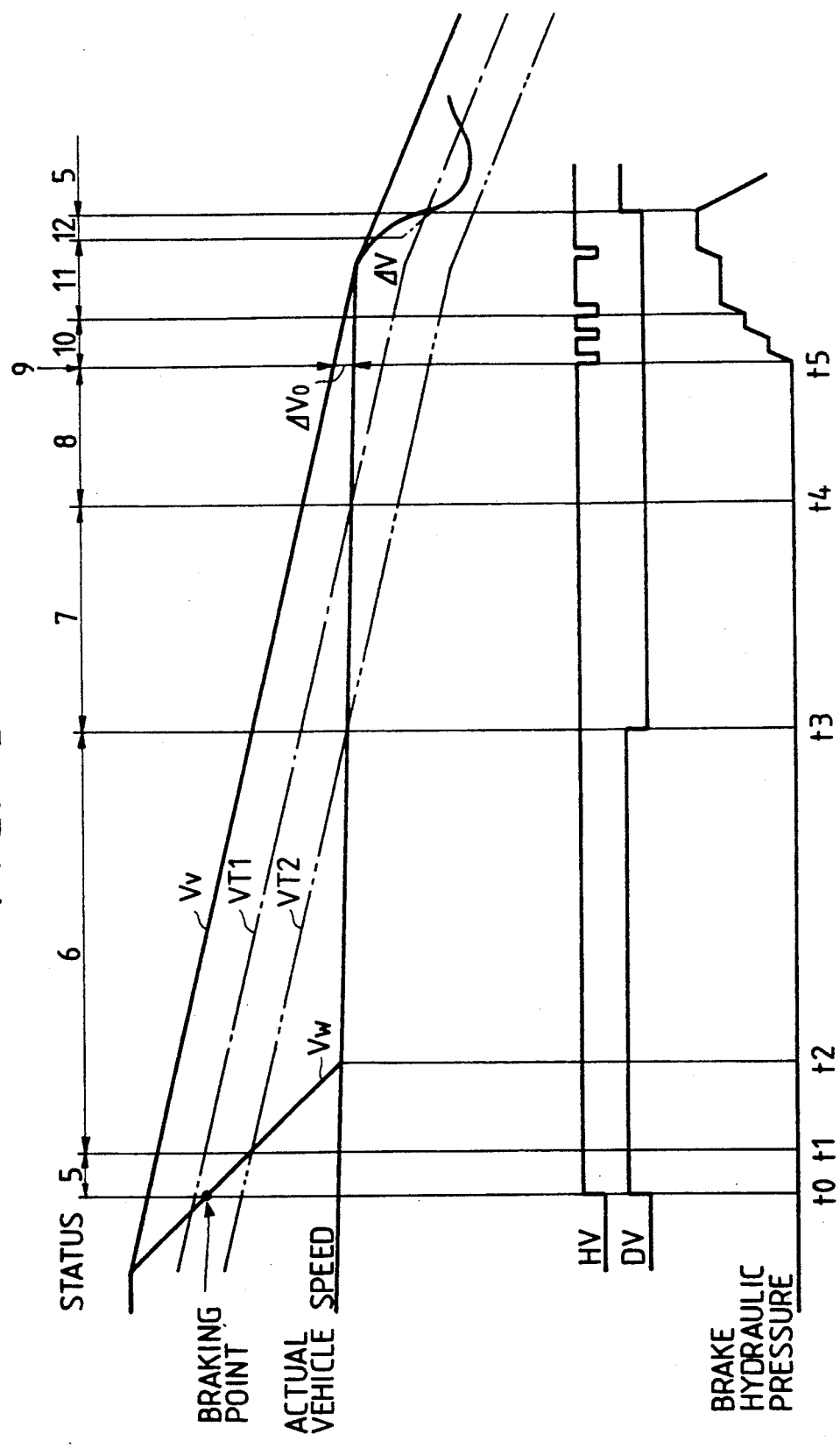

ANTI-LOCK CONTROL METHOD FOR AUTOMOTIVE VEHICLES

BACKGROUND OF THE INVENTION

The present invention relates to anti-lock control method and apparatus for preventing the locking of the automotive wheels of a running vehicle during the braking thereof and, more particularly, to an anti-lock control method in which an estimated vehicle speed is prevented from moving away from an actual vehicle speed due to an acceleration slip of an automotive wheel.

In a conventional anti-lock control apparatus for a vehicle, a controller including a microcomputer performs anti-lock control in such a manner that the mode of controlling the brake-liquid hydraulic pressure is determined on the basis of an electric signal indicative of a wheel speed detected by a wheel speed sensor. According to the detected mode, a hold valve, which is a normally-open solenoid valve, and a decay valve, which is a normally-closed solenoid valve, are selectively opened or closed to increase, hold or decrease the brake hydraulic pressure in order to keep the vehicle steerable and stable and to shorten the braking distance thereof.

The present inventor filed a U.S. patent application (Ser. No. 07/403375, now U.S. Pat. No. 4,984,164) as a related art of the present invention. An anti-lock control method described in the U.S. patent application will be hereinafter described for the purpose of a clear understanding of the present invention.

In the anti-lock control method, a reference speed Vr for pressure decrease judgment is set on the basis of the speed (hereinafter referred to as the wheel speed Vw) of each of wheels controlled by brake control units for the four wheels of a vehicle. An estimated vehicle speed is set, which follows the highest wheel speed (four-wheel select-high speed VwH) selected among the wheel speed Vw but whose decrease in its following the four-wheel select-high speed VwH is limited within a prescribed range of speed decrease rate. A first and a second threshold speeds VT1 and VT2 which follow the estimated vehicle speed Vv with prescribed speed differences therefrom are set (Vv>VT1>VT2). Statuses of pressure increase, pressure hold and pressure decrease, which are described hereinafter, are set on the basis of the comparison of the wheel speed Vw with the estimated vehicle speed Vv and with the reference speed Vr or the threshold speeds VT1 and VT2. A hold valve HV and a decay valve DV, which are solenoid valves, are opened or closed in prescribed control manners set for the statuses, to perform the pressure increase, the pressure hold or the pressure decrease.

FIG. 4 is a control time chart indicating the change in the wheel speed Vw and the brake hydraulic pressure Pw and the opening and closing of the hold valve HV and the decay valve DV in the anti-lock control.

The reference speed Vr is set as described from now on.

When the brake of the vehicle is not in operation during the movement of the vehicle, the brake hydraulic pressure Pw is not increased, the hold valve HV is open and the decay valve DV is closed. As shown in FIG. 4, when the brake is put in operation at a time point A, the brake hydraulic pressure Pw begins to be increased at the time point A, the brake hydraulic pressure rises sharply (in an ordinary mode) from the time point A, and the wheel speed Vw is thereby decreased. The reference speed Vr is set so that it follows the wheel speed Vw with a speed difference $\Delta V$ therefrom so as to be lower than the wheel speed, and that the reference speed begins to rectilinearly fall with a speed decrease gradient $\theta$ of $-1$ G when the deceleration $dVw/dt$ (negative acceleration) of the wheel has reached a prescribed threshold value of $-1$ G, for example, at a time point B.

Statuses shown in FIG. 4 are described from now on.

(Status 0)

The status 0 lasts from the time point A at which a brake switch is turned on by depressing a brake pedal, to the time point B at which the rectilinearly falling reference speed Vr is generated because the deceleration $dVw/dt$ of the wheel speed Vw reaches the prescribed value of $-1$ G, for example. In the status 0, the hold valve is open, the decay valve is closed, and the brake hydraulic pressure in a wheel cylinder is increased because of the supply of the liquid from a master cylinder.

(Status 1)

The status 1 lasts from the time point B at which the rectilinearly falling reference speed Vr is generated, to a time point C at which the deceleration $dVw/dt$ of the wheel speed Vw is judged to have reached a prescribed value $-Gmax$. In the status 1, the hold valve and the decay valve are not in operation.

(Status 2 (pressure hold))

The status 2 lasts from the time point C for the $-Gmax$ judgement, to the earlier one of a time point (pressure decrease time point a) at which the wheel speed Vw becomes lower than the reference speed Vr, and a time point (pressure decrease time point b) at which the wheel speed Vw becomes lower than the first threshold speed VT1. AT the time point C, the hold valve is closed so that the brake hydraulic pressure is held. The status 2 terminates at a time point D at which the wheel speed Vw becomes lower than the reference speed Vr. However, if the wheel speed Vw becomes lower than the first threshold speed VT1 before the time point D, the status 2 terminates when the wheel speed has become lower than the first threshold speed VT1.

(Status 3 (pressure decrease))

The status 3 lasts from the time point D at which the wheel speed Vw becomes lower than the reference speed Vr, to a time point E at which the wheel speed Vw becomes lower than the first threshold speed VT1. At the time point D, the decay valve is opened so that the brake hydraulic pressure Pw begins to be decreased.

(Status 4 (pressure decrease))

The status 4 occurs when the anti-lock control is performing or has completed the second step thereof and the decrease rate VvG of the estimated vehicle speed Vv is smaller than $-0.22$ G. The status 4 lasts until one of three conditions (1), (2) and (3) mentioned below arises after the wheel speed Vw becomes lower than the first threshold speed VT1.

(1) A decay timer put in timing action at the time of the start of the pressure decrease becomes put out of timing action to prevent the pressure decrease from being excessively done.

(2) The wheel speed Vw becomes lower than the second threshold speed VT2.

(3) The wheel speed Vw is judged to be at a low peak, by detecting that the rates of the decrease and increase in the wheel speed Vw is within a prescribed range from −0.22 G to +0.22 G, for example.

(Status 5 (pressure decrease))

The status 5 occurs when the anti-lock control is performing the first step thereof or the rate VvG of the decrease in the estimated vehicle speed Vv is larger than −0.22 G. The status 5 lasts from the time point E at which the wheel speed Vw becomes lower than the first threshold speed VT1, to the earlier one of a time point F at which the wheel speed is judged to be at the low peak, and a time point F' at which the wheel speed Vw becomes lower than the second threshold speed VT2 as shown by a dotted line in FIG. 4.

(Status 6 (pressure decrease))

The status 6 occurs when the wheel speed Vw is lower than the second threshold speed VT2. The status 6 lasts from the time point F' to a time point F''.

(Status 7 (pressure hold))

The status 7 begins when one of three conditions (1), (2) and (3) mentioned below arises.

(1) The wheel speed Vw is judged to be at the low peak in the statuses 4 or 5.

(2) The decay timer is put out of timing action in the status 4.

(3) The wheel speed Vw becomes higher than the second threshold speed VT2 in the status 6 (at the time point F'').

The status 7 lasts from the above-mentioned beginning to a time point G at which the wheel speed Vw becomes higher than the first threshold speed VT1. If the wheel speed Vw does not become higher than the first threshold speed VT1 at or after the lapse of a prescribed time T1 in the status 7, the status is replaced by the status 4 so that the pressure decrease is performed again.

(Status 8 (pressure hold))

The status 8 lasts from the time point G at which the wheel speed Vw becomes higher than the first threshold speed VT1, to a time point H at which a status 9 exists.

(Status 9 (pressure increase start point))

The status 9 exists at the time point H at which the wheel speed Vw becomes higher than a speed $Vv - \Delta V_0$ which is lower by a prescribed value $\Delta V_0$ than the estimated vehicle speed Vv.

(Status 10 (fast build-up))

The status 10 lasts from the time point H at which the wheel speed Vw becomes higher than the speed $Vv - \Delta V_0$, to a time point I at which a prescribed time T3 has elapsed since the time point H. In the status 10, the hold valve is repeatedly opened and closed so that the brake hydraulic pressure is increased relatively sharply.

(Status 11 (slow build-up))

The status 11 lasts from the time point I at which fast build-up in the status 10 terminates, to a time point J at which the reference speed Vr is generated. In the status 11, the hold valve is opened and closed longer than opened, so that the brake hydraulic pressure is increased slowly.

(Status 12 (slow build-up))

The status 12 lasts from the time point J at which the reference speed Vr is generated, to the earlier one of a time point at which the wheel speed Vw becomes lower than the reference speed Vr, and a time point at which the wheel speed Vw becomes lower than the first threshold speed VT1. FIG. 4 shows that the status 12 terminates at the time point K at which the wheel speed Vw becomes lower than the first threshold speed VT1. However, if the wheel speed Vw becomes lower than the reference speed Vr before the time point K, the status 12 terminates when the wheel speed Vw has become lower than the reference speed Vr. At the time of the termination of the status 12, the status 4 or 5 arises again.

The anti-lock control method described above has an advantage that the anti-lock control can be appropriately performed to cope with various circumstances. However, a problem described from now on occurs if the estimated vehicle speed Vv increases far from the actual vehicle speed due to the acceleration slip of the driving wheel of the vehicle at the time of the start of the anti-lock control thereof.

When at least one driving wheel of he vehicle performs acceleration slip, the four-wheel select-high speed VwH rises sharply and the estimated vehicle speed Vv increases away from the actual vehicle speed along with the sharp rise in the four-wheel select high speed as shown in FIG. 5. When the speed of the wheel sharply decreases immediately after the acceleration slip thereof, a large speed difference occurs between the estimate vehicle speed Vv and the four-wheel select-high speed VwH because the decrease in the estimated vehicle speed Vv in its following the four-wheel select-high speed VwH is limited within a prescribed range of speed decrease rate. As a result, the threshold speeds VT1 and VT2, which are set on the basis of the estimated vehicle body speed Vv, are set to be higher relative to the four-wheel select-high speed VwH.

When the brake of the vehicle is put in operation during the sharp decrease in the driving wheel speed at a time point t0 shown in FIG. 5, the status 5 which a pressure decrease mode is brought about at the start of the anti-lock control because the wheel speed Vw has already become lower than the first threshold speed VT1 at the time point t0. The status 6 which is a pressure decrease mode begins at a time point t1 at which the wheel speed Vw decreases t0 be lower than the second threshold speed VT2. The wheel speed Vw becomes equal to the actual vehicle speed at a time point t2. The status 6 which is the pressure decrease mode lasts to a time point t3 at which the wheel speed Vw becomes higher than the second threshold speed VT2 because the threshold speed decreases along with the fall in the estimated vehicle speed Vv. The status 7 which is a pressure hold mode begins at the time point t3 because the wheel speed Vw becomes higher than the second threshold speed VT2. The status 8 which is a pressure keeping mode begins at a time point t4 at which the wheel speed Vw becomes higher than the first threshold speed VT1. The status 8 lasts to a time point t5 at which the wheel speed Vw becomes equal to the speed $Vv - \Delta V_0$ lower than by the prescribed value $\Delta V_0$ than the estimated vehicle speed Vv and at which the status 9 begins.

As described above, although the brake is put in operation at the time point t0, the vehicle is not braked since the time point t0 until the estimated vehicle speed Vv decreases to be nearly equal to the actual vehicle speed in the status 9, since the brake hydraulic pressure is not increased before the time point t0 and the statuses lasting from the time point t0 to the time point t5 are the pressure decrease mode and the pressure hold mode. This is the problem. In FIG. 5, the wheel speed Vw, which is caused due to the acceleration slip of the automotive wheel, can be regarded as equal to the four-wheel select-high speed VwH until the beginning of the status 9 because the brake hydraulic pressure for any Wheel of the vehicle is not increased.

SUMMARY OF THE INVENTION

Accordingly, it is an object of the present invention to provide an anti-lock control method in which a vehicle is prevented from being not braked at the start of anti-look control immediately after an estimated vehicle speed has changed from the actual vehicle speed as the wheel of the vehicle performs an acceleration slip before the start of the anti-lock control.

In order to attain the above-noted and other objects, the anti-lock control method provided in accordance with the present invention is characterized in that if the highest one VwH of the speeds of the four wheels of the vehicle is still lower than a prescribed threshold speed and not increasing at a second time point which comes a prescribed time $\Delta T$ after a first time point at which the highest wheel speed becomes lower than the threshold speed, the estimated vehicle speed is modified to be equal to the highest wheel speed VwH.

BRIEF DESCRIPTION OF THE DRAWINGS

In the accompanying drawings:

FIGS. 4 and 5 are time charts of an anti-lock control method which is a related art of the present invention.

DETAILED DESCRIPTION OF THE PREFERRED EMBODIMENTS

An embodiment of the present invention is hereafter described in detail with reference to the drawings attached hereto.

Figure 1:
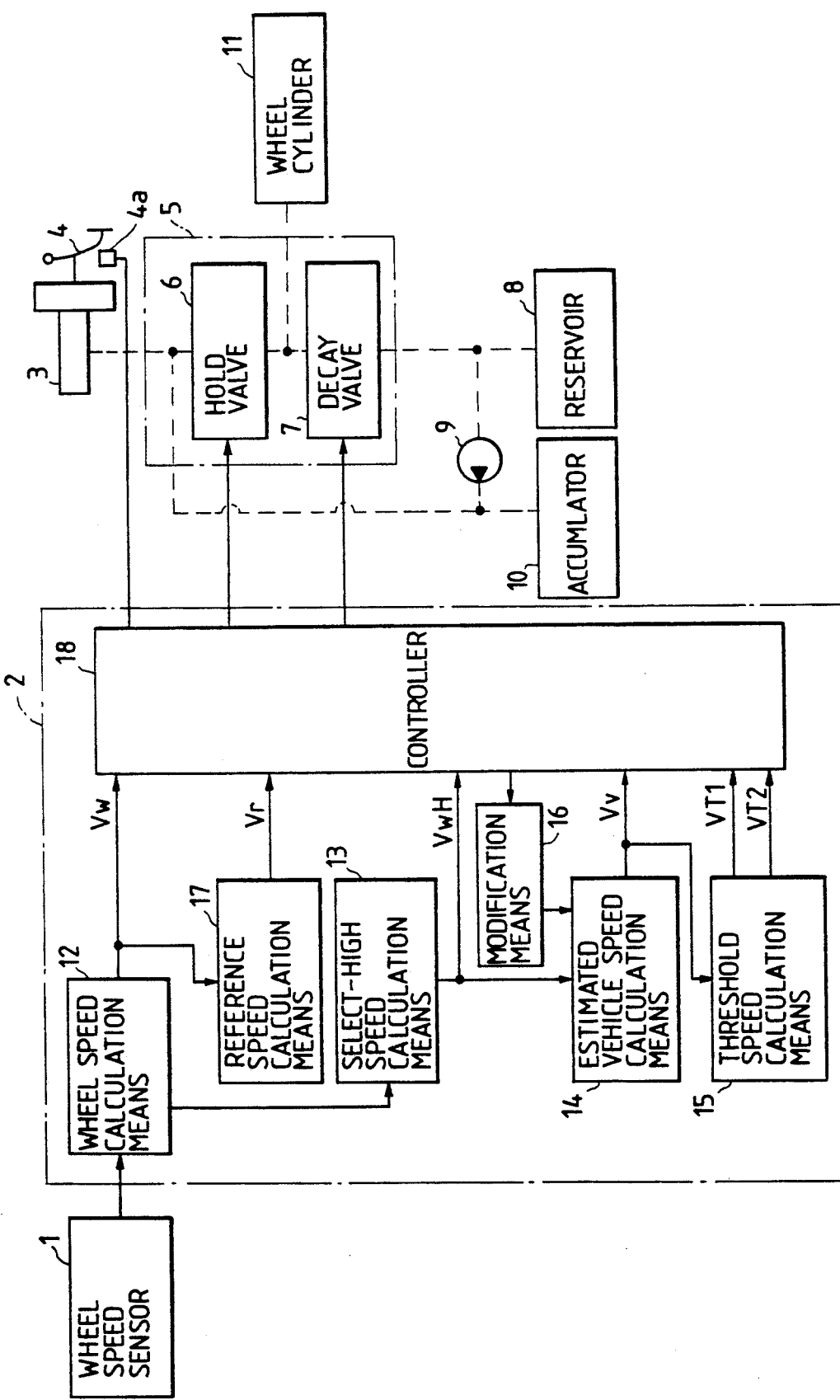
FIG. 1 is a block diagram of a control unit for practicing an anti-lock control method according to an embodiment of the present invention.

FIG. 1 is a block diagram of a control unit or apparatus for practicing an anti-lock control method according to the embodiment of the present invention. The control apparatus comprises a wheel rotation speed sensor 1 which is one of those attached to the four wheels of a vehicle, a controller 2 made of a computer, a master cylinder 3 which is operated by a brake pedal 4, a modulator 5 including a hold valve 6 which is a normally-open solenoid valve and a decay valve 7 which is a normally-closed solenoid valve, a reservoir 8 from which a braking hydraulic liquid is pumped by a pump 9 so as to be stored in an accumulator 10, a brake switch 4a which is turned on by depressing the brake pedal 4, and the wheel cylinder 11 of a brake for the wheel.

The controller 2 includes speed calculation means 12 for calculating the speeds Vw of the wheels of the vehicle from the outputs from the wheel rotation speed sensors 1, select-high speed calculation means 13 by which the highest one of the speeds Vw is selected as a four-wheel select-high speed VwH, estimated vehicle speed calculation means 14 by which the four-wheel select-high speed VwH is processed through a filter for deceleration of $-1$ G so that an estimated vehicle speed Vv is obtained, and threshold speed calculation means 15 for calculating a first and a second threshold speeds VT1 and VT2 which follow the estimated vehicle speed Vv with prescribed speed differences therefrom (Vv>VT1>VT2). The controller 2 further includes modification means 16 for modifying the estimated vehicle speed Vv to equalize it to the four-wheel select-high speed VwH when a prescribed condition mentioned hereinafter arises, reference speed calculation means 17 by which a reference speed Vr which rectilinearly decreases at the rate of $-1$ G from a level which is lower by a prescribed value $\Delta V$ than the wheel speed Vw is calculated when the rate of the decrease in the wheel speed has reached a prescribed value of $-1$ G, for example, and a control section 18 which performs control so that the hold valve 5 and the decay valve 6 are opened or closed on the basis of the outputs from the means 12, 13, 14, 15 and 17 to increase, hold or decrease the brake hydraulic pressure in the wheel cylinder 11.

Figure 2:
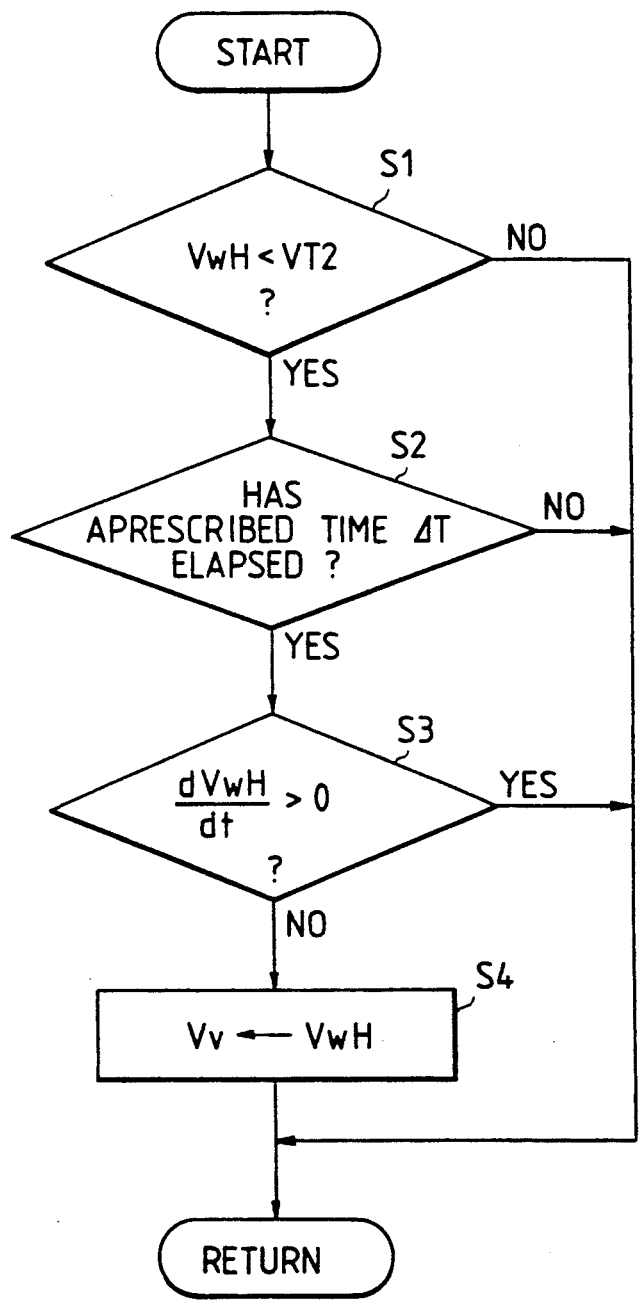
FIG. 2 is a flow chart of the method.

FIG. 2 shows a flow chart of the anti-lock control method according to an embodiment of the present invention. If the vehicle has a brake system of the two-pair X-piping type, i.e. so called cross piping type, in which the right rear wheel and the left front wheel form a pair and the right front wheel and the left rear wheel form another pair, the lower one of the speeds of the wheels in each of the pairs is handled as a controlled wheel speed (pair speed) and the modulator 5 for the pair is regulated to control the brake hydraulic pressure in the method.

In a step S1 shown in FIG. 2, it is judged whether or not the four-wheel select-high speed VwH is lower than the second threshold speed VT2. If it is judged in the step S1 that the speed VwH is lower than the threshold speed VT2, a step S2 is taken so that it is judged through time measurement whether or not a prescribed time $\Delta T$ has elapsed since a time point at which the speed VwH becomes lower than the second threshold speed, i.e. at which the status 5 is replaced by the other status 6. If it is judged in the step S2 that the prescribed time $\Delta T$ has elapsed since the time point, it is judged in a step S3 whether or not the four-wheel select-highest speed VwH increasing, namely, a relationship of dVwH/dt>0 is present. If it is judged in the step S3 that the speed VwH is decreasing, namely, a relationship of dVwH/dt$\leq$0 is present, the estimated vehicle speed Vv is modified to be equal to the speed VwH in a step S4.

Figure 3:
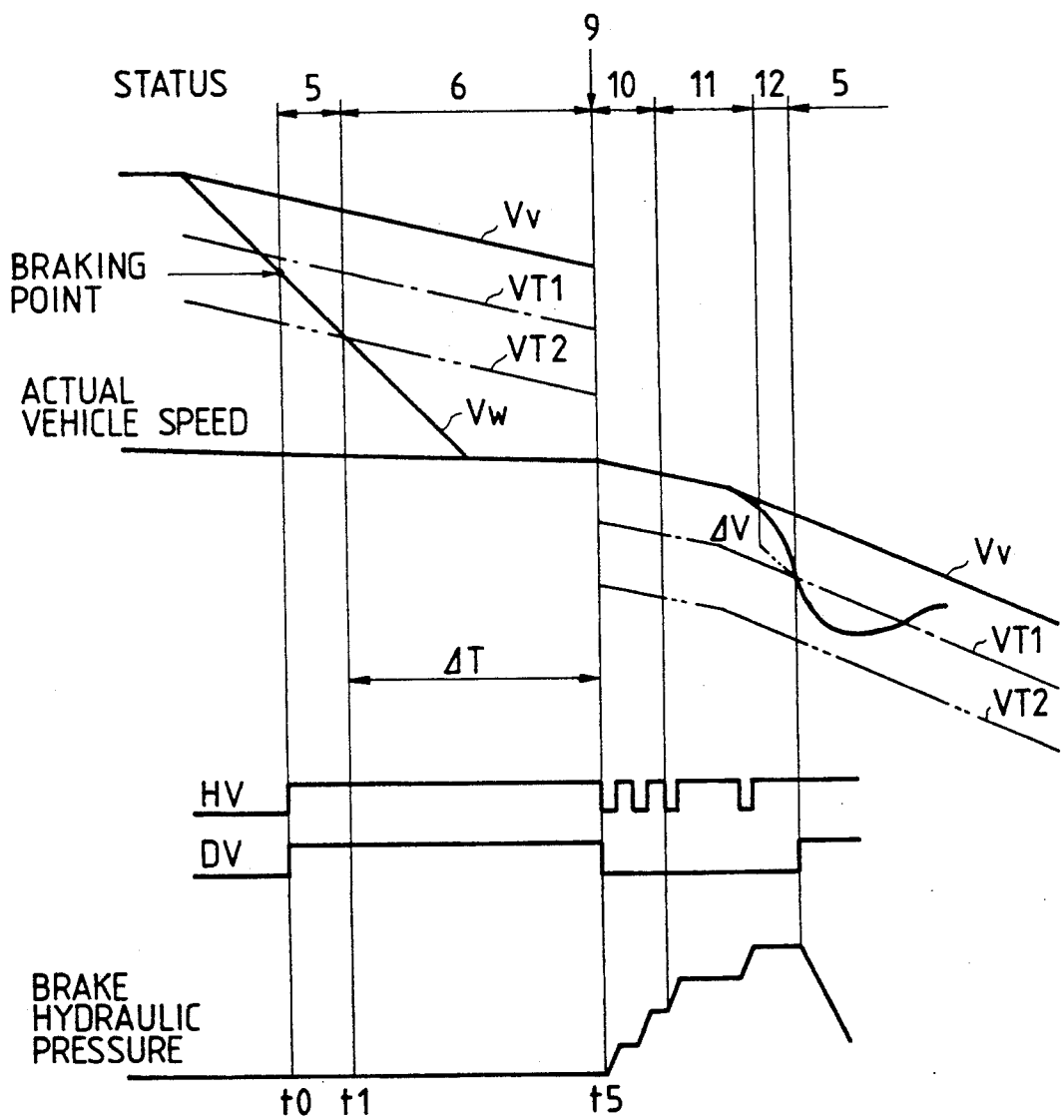
FIG. 3 is a time chart of the method.
Figure 4:
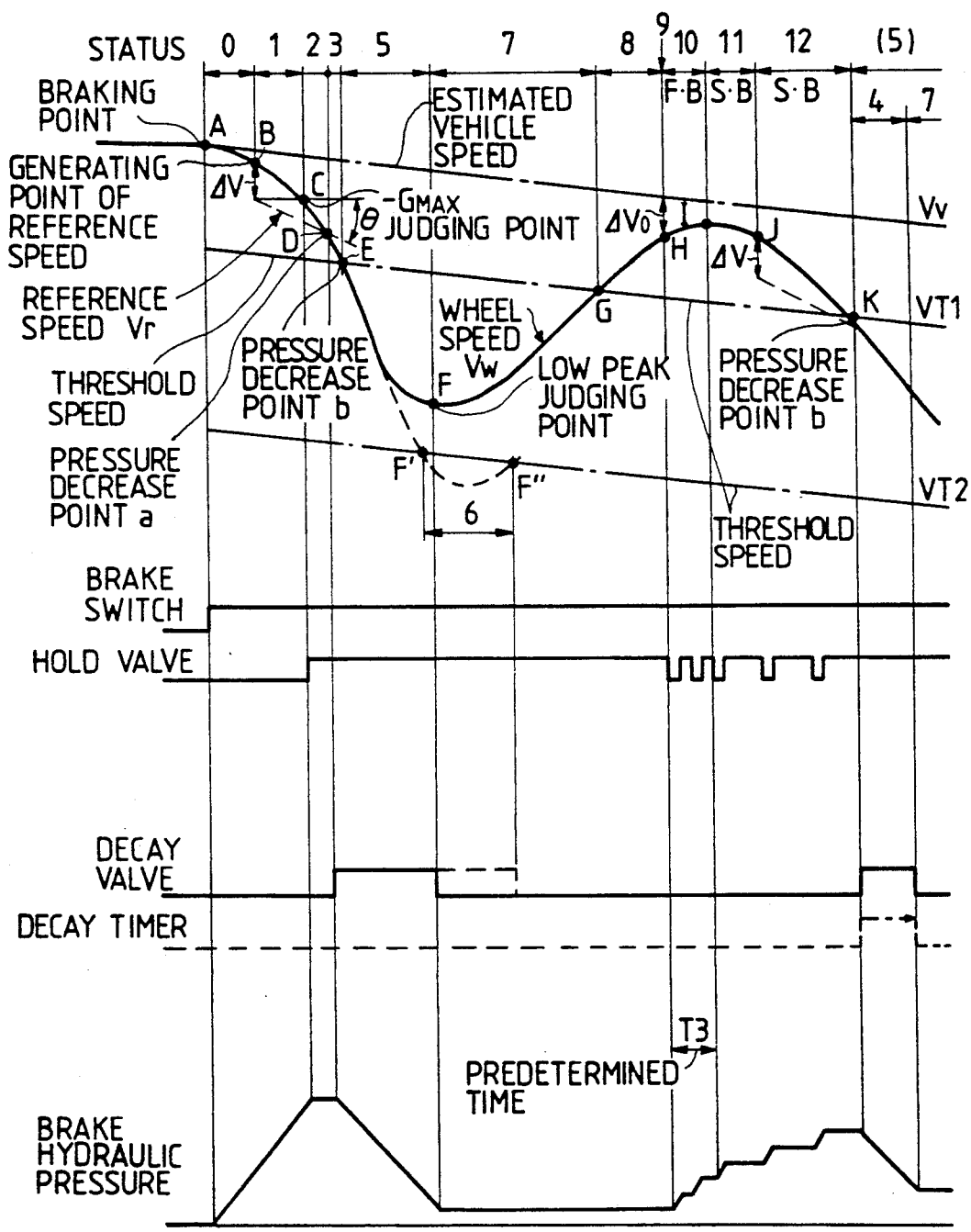

FIG. 3 shows a time chart of the anti-lock control method according to the embodiment of the present invention. Statuses shown therein are the same as those mentioned above. When the driving wheel of the vehicle performs an acceleration slip, the four-wheel select-high speed VwH, which corresponds to the wheel speed Vw in FIG. 3, becomes higher than the actual vehicle speed and the estimated vehicle speed Vv, thereby, increases far from the actual vehicle speed. If the brake of the vehicle is put in operation at a time point t0 at which the wheel speed Vw already becomes lower than the first threshold speed VT1 because the wheel sharply slows down immediately after the acceleration slip, the status 5 which is a pressure decrease mode lasts from the time point t0 to a time point t1 at which the wheel speed becomes lower than the second threshold speed VT2, as shown in FIG. 3. Since the wheel speed Vw becomes lower than the second threshold speed VT2 at the time point t1, the status 6 which is a pressure decrease mode begins at the time point. If the wheel speed Vw is still lower than the second threshold speed VT2 and not increasing, at a time point t5 at which the prescribed time $\Delta T$ has elapsed since the time point t1, the estimated vehicle speed Vv is modified to be equal to the four-wheel select high-speed VwH at the time point t5 so that the condition for bringing about the status 9, in which a pressure increase is started, arises. For that reason, the status 6 terminates at the time point t5, the status 10 which is a pressure increase (fast build-up) mode begins immediately after the termination, and the two threshold speeds VT1 and VT2 decrease along with the coincidence of the estimated vehicle speed Vv and the four-wheel select-high speed VwH. The anti-lock control can thus be normalized at and after the time point t5.

The prescribed time $\Delta T$ is preset to be equal to a time which it takes for the brake hydraulic pressure to fall from a first level high enough to lock the wheel on a road of high friction coefficient, to a second level of nearly no remaining pressure. In other words, the first and second level is regard as maximum and minimum values in the brake hydraulic pressure for braking and running vehicle, respectively. Therefore, there is no case where the brake hydraulic pressure is further decreased in spite of having elapsed the prescribed time $\Delta T$ corresponding to the time which it takes for the brake hydraulic pressure to be decreased from the maximum value to the minimum value. However, if such a case occurs by an abnormality as described above, in the anti-lock control method of the present invention, the estimated vehicle speed is modified at the time point t5 at which the prescribed time $\Delta T$ has been elapsed. The wheel speed Vw until the status 9 shown in FIG. 3 can be regarded as equal to the four-wheel selection highest speed VwH because the brake hydraulic pressure is not increased for any wheel of the vehicle.

According to the present invention, if a four-wheel select-high speed VwH has sharply increased due to the acceleration slip of the driving wheel of a vehicle in the non-braking thereof to cause an estimated vehicle speed Vv to become higher than the actual vehicle speed and anti-lock control is thereafter started during the sharp decrease in the speed of the wheel to bring about a pressure decrease mode, the estimated vehicle speed is modified to be equal to the four-wheel select-high speed at a time point at which a prescribed time $\Delta T$ has elapsed since the pressure decrease mode was brought about. For that reason, even if the four-wheel select-high speed VwH has risen far from the actual vehicle speed due to the acceleration slip of the wheel before the start of the braking thereof, the estimated vehicle speed Vv in anti-lock control becomes equal to the actual vehicle speed in a short time. As a result, the vehicle is prevented from being not braked at and after the start of the anti-lock control.

What is claimed is:

1. A method of anti-lock control of a vehicle, comprising the steps of:
    selecting the highest speed VwH of the four wheels of said vehicle;
    setting an estimated vehicle speed Vv, whose rate of speed decrease follows said highest speed VwH by a prescribed range of speed decrease rates;
    setting a threshold speed VT, which follows said estimated vehicle speed with a prescribed speed difference therefrom;
    continuing the decrease in the brake hydraulic pressure until a wheel speed Vw becomes higher than said threshold speed VT when said wheel speed Vw, which is being controlled by a brake with anti-lock control, has become lower than said threshold speed VT during the decrease in the brake hydraulic pressure;
    increasing said brake hydraulic pressure when said wheel speed recovered has become higher than a speed $Vv - \Delta V_0$, which is said estimated speed Vv lowered by a prescribed value $\Delta V_0$; and
    modifying said estimated vehicle speed to be equal to said highest speed when said highest speed VwH is still lower than said threshold speed VT and not increasing at a second time point, which is a prescribed time period $\Delta T$ after a first time point that began when said highest speed VwH became lower than said threshold speed VT.

2. The method according to claim 1, wherein said prescribed time $\Delta T$ is preset to be equal to a time which it takes for the brake hydraulic pressure to fall from a level enough to lock the wheel on a road of high friction coefficient, to a level of nearly no remaining pressure.

3. An anti-lock control method for preventing locking of vehicle wheels when braking by repetition of an increase and a decrease of brake hydraulic pressure in response to an electrical signal, comprising the steps of:
    setting an estimated vehicle speed Vv based on a highest wheel speed Vw among wheel speeds for all the wheels at the time of braking;
    setting a first threshold speed VT1 and a second threshold speed VT2 that correspond over time to said estimated vehicle speed Vv with a predetermined speed difference that is constant over said time so as to satisfy a relation Vv>VT1>VT2;
    setting a reference wheel speed Vr, when said wheel speed Vw attained a predetermined deceleration in response to an increase in said brake hydraulic pressure, which linearly decreases during the time of said predetermined deceleration from an initial reference wheel speed $(Vw - \Delta V)$ which is lower than said wheel speed Vw by a predetermined amount $\Delta V$;
    decreasing said brake hydraulic pressure by establishing a decompression status period which begins from a first time point which ever happens sooner between a time at which said wheel speed Vw becomes lower than said reference wheel speed Vr and a time point at which said wheel speed Vw becomes lower than said first threshold speed VT1, said decompression status period ending at a second time point whichever happens sooner between a first possible time point at which said wheel speed Vw attains a low peak and a second possible time point, said second possible time point being defined whereby after a third possible time point at which said wheel speed Vw is dropped to below said second threshold speed VT2, said wheel speed Vw becomes higher than said second threshold speed VT2; and
    modifying said estimated vehicle speed to be equal to said wheel speed Vw if said wheel speed Vw is still below said second threshold speed VT2 and said decompression status period is still continued at a fourth possible time point at which a prescribed time $\Delta V$ has elapsed since said third possible time point.

4. An anti-lock control apparatus for a vehicle, comprising:
    means for sensing respective wheel speeds Vw of wheels of the vehicle;
    means for braking the vehicle wheels;
    means for controlling said braking means to increase, hold and decrease the brake hydraulic pressure of said brake means by establishing increase, hold and decrease modes, respectively, according to an output of said sensing means, said control means setting a vehicle sped Vv and a threshold speed VT2, said threshold speed corresponding over time to said vehicle sped with a predetermined difference that is constant over said time so as to satisfy a relation $Vv > VT2$, wherein, said decrease mode to decrease said brake hydraulic pressure ends at a first time point at which said wheel speed Vw becomes higher than said threshold speed VT2 if said wheel speed Vw has dropped to below said threshold speed VT2 in said decrease mode, and said increase mode to increase said hydraulic pressure begins at a second time point at which said wheel speed Vw, which has become higher than said threshold speed VT2 at said first time point, becomes higher than a speed $Vv - \Delta V_0$ which is lower by a prescribed value $\Delta V_0$ than said vehicle speed Vv; and means for modifying said vehicle speed Vv to be equal to said wheel speed Vw if said speed Vw is still lower than said threshold speed VT2 and an acceleration dVw/dt of said wheel speed Vw is still negative or zero at a third time point at which a prescribed time $\Delta T$ has elapsed from a fourth time point at which said wheel speed Vw has dropped to below said threshold speed VT2 in said decrease mode.

* * * * *